No. 633,249. Patented Sept. 19, 1899.
H. RATHIER.
METHOD OF FORMING ELECTRODES FOR SECONDARY OR STORAGE BATTERIES.
(Application filed Oct. 22, 1898.)
(No Model.)
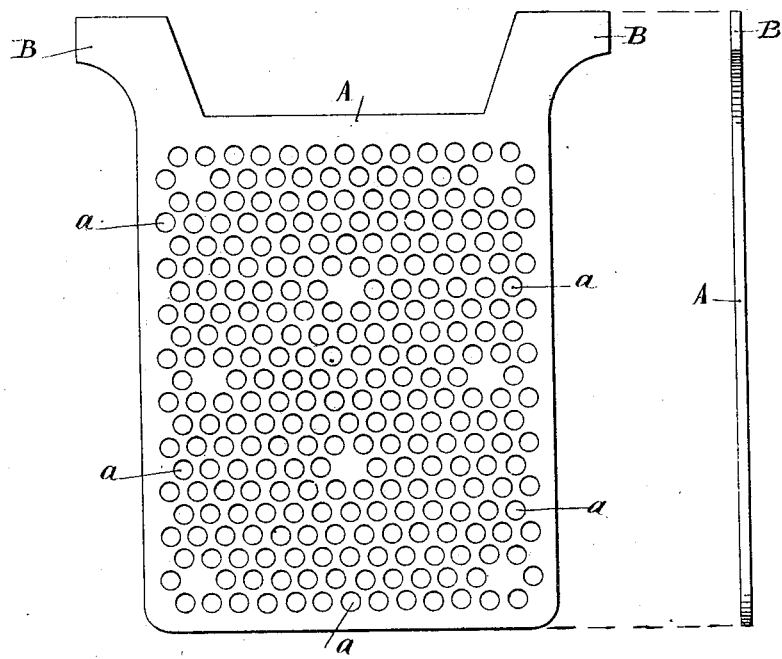
Witnesses.
J. C. Lebret.
A. Witt.
Inventor.
Henri Rathier,
By H. A. delVos.
Attorney.

UNITED STATES PATENT OFFICE.

HENRI RATHIER, OF PARIS, FRANCE.

METHOD OF FORMING ELECTRODES FOR SECONDARY OR STORAGE BATTERIES.

SPECIFICATION forming part of Letters Patent No. 633,249, dated September 19, 1899.

Application filed October 22, 1898. Serial No. 694,304. (No specimens.)

*To all whom it may concern:*

Be it known that I, HENRI RATHIER, a citizen of the Republic of France, residing at the city of Paris, France, have invented certain new and useful Improvements in and Methods of Forming Electrodes for Secondary or Storage Batteries, &c., of which the following is a specification, such as will enable others skilled in the art to which it appertains to make and use the same.

To such ends my invention consists of an electrode the grid of which is cast of an alloy of lead and antimony and having perforations therein, which perforations are filled and the plate also covered with red lead compressed to a high degree or with a mixture of red lead with litharge, and of the method of forming such electrodes, hereinafter more particularly described, which consists, mainly, in immersing the plates at various portions of the process of formation in suitable acids, although it is not to be understood that the invention or inventions are limited to an electrode of the exact combination shown and described nor to a method of forming the same necessarily comprising at once all the steps or steps taken in the same order set forth herein, for the invention consists of the combination and arrangement of certain steps or of devices and parts, all as hereinafter more fully set forth in the specification, and pointed out in the claims.

Such electrode and my new and improved method of forming the same are fully shown and described in the following specification, of which the accompanying drawings form a part, wherein similar letters of reference designate like or equivalent parts throughout both views, and in which—

Figure 1 designates a front view of my improved electrode-plate, and Fig. 2 a side view thereof.

Such plate is usually provided with two side top ears B, by which the plates can be supported in a casing or vessel of the usual form out of contact with the bottom thereof, through which the various plates may be coupled together. The reference-letter $a$ designates the perforations in the plate, which are filled with the active material.

To carry out my improved method of forming such electrode or plates, a mixture composed of eighty-five per cent. metallic lead and fifteen per cent. antimony are melted and thoroughly mixed together by stirring, and the alloy so formed is then cast into a perforated grid or plate of substantially the shape shown in the drawings, so as to be provided with numerous perforations or holes $a$ through the same, which may be of any desired shape and size. The plates so formed are then immersed for about one hour in sulfuric acid of, say, 40° Baumé. The exact effect of such acid upon the plates is uncertain; but I have found that when this is done a plate of greater electric retentivity, strength, and life is formed than without this immersion. For those plates which are to form positive electrodes I then take a paste formed of pure pulverized red lead and any suitable liquid vehicle, such as water or water diluted with sulfuric acid, or any other well-known vehicle used for making such pastes and then pack the holes or perforations $a$ therewith and also completely cover the entire surface of the plate except the ears B with such paste. If the plates are to form negative electrodes, instead of pure pulverized red lead I form such paste of a mixture of five (5) parts of litharge and one (1) part of red lead, mixed together and applied in the same manner as hereinbefore set forth. The plates so covered with such lead oxids in the form of paste are then submitted to the pressure of any suitable press, so as to cause the same to adhere firmly to the perforated grid, and are then usually thoroughly dried, so as to expel all the water contained in the paste. The plates are then dipped in sulfuric acid of 30° Baumé just long enough to thoroughly saturate the paste with the acid, generally anywhere from one to five minutes, when they are withdrawn, and any lumps or swellings which may have formed thereon are removed with a scraper, after which the plates are set up in a vessel of the well-known form filled with a suitable electrolytic liquid to form a storage battery or electric accumulator. I have found by experiment that the pickling or soaking of the plates in acid of the strength set forth both before and after the application of the lead-oxid paste, or either soaking singly without the other, makes the plate of longer life and much greater intensity and equality of force than otherwise, and these effects are much greater when both picklings are had.

Having thus fully described my invention, what I claim as new, and desire to secure by Letters Patent, is—

1. The hereinbefore-described method of making secondary-battery plates which consists in forming suitable supporting plates or grids, immersing and pickling the same in acid, mixing a suitable paste composed of red lead and a suitable vehicle, applying the same to the grids or plates to be used for one pole of the battery, mixing in like manner a paste composed of one (1) part of red lead and five (5) parts of litharge, and then applying such paste to the grids or plates to be used for the other pole of the battery, substantially as described and for the purposes set forth.

2. The hereinbefore-described method of making secondary-battery plates which consists in forming suitable supporting plates or grids, immersing and pickling the same in acid, mixing a suitable paste composed of red lead and a suitable vehicle, applying the same to the grids or plates to be used for one pole of the battery, mixing in like manner a paste composed of one (1) part of red lead and five (5) parts of litharge, applying such paste to the grids or plates to be used for the other pole of the battery, and then soaking the plate in an acid, substantially as described and for the purposes set forth.

3. The hereinbefore-described method of making secondary-battery plates which consists in forming suitable supporting plates or grids, immersing and pickling the same in acid, mixing a suitable paste composed of red lead and a suitable vehicle, applying the same to the grids or plates to be used for one pole of the battery, mixing in like manner a paste composed of one (1) part of red lead and five (5) parts of litharge, applying such paste to the grids or plates to be used for the other pole of the battery, and then scraping off the lumps or swellings, substantially as described and for the purposes set forth.

4. As an article of manufacture, a battery-plate, the supporting grid or plate of which is composed of an alloy of lead and antimony, and carrying an oxid paste formed of a suitable vehicle, and one (1) part of red lead and five (5) parts of litharge, substantially as shown and described and for the purposes set forth.

In testimony that I claim the foregoing I have hereunto set my hand this 8th day of October, 1898.

HENRI RATHIER.

Witnesses:
EDWARD P. MACLEAN,
SEXTON MATRAY.